US012672641B2

(12) United States Patent
Thomerson

(10) Patent No.: US 12,672,641 B2
(45) Date of Patent: Jul. 7, 2026

(54) MOBILITY IMPAIRED ANIMAL POTTY AND BLADDER EXPRESSION STATION

(71) Applicant: RIDE Institute, LLC, Fort Lauderdale, FL (US)

(72) Inventor: John D. Thomerson, Fort Lauderdale, FL (US)

(73) Assignee: RIDE Institute, LLC, Fort Lauderdale, FL (US)

( * ) Notice: Subject to any disclaimer, the term of this patent is extended or adjusted under 35 U.S.C. 154(b) by 0 days.

(21) Appl. No.: 18/535,581

(22) Filed: Dec. 11, 2023

(65) Prior Publication Data

US 2024/0341266 A1 Oct. 17, 2024

Related U.S. Application Data

(60) Provisional application No. 63/431,401, filed on Dec. 9, 2022.

(51) Int. Cl.
*A01K 29/00* (2006.01)
*A61D 9/00* (2006.01)

(52) U.S. Cl.
CPC .............. *A01K 29/004* (2025.08); *A61D 9/00* (2013.01)

(58) Field of Classification Search
CPC .................................................... A01K 29/004
See application file for complete search history.

(56) References Cited

U.S. PATENT DOCUMENTS 833,119 A * 10/1906 Buckingham ........ A01K 1/0613
119/725
1,366,178 A 1/1921 Eugene
(Continued)

FOREIGN PATENT DOCUMENTS

CA 3070350 A1 * 1/2019 ............. A01K 29/00
DE 102009042000 A1 * 3/2011 ............... A61D 3/00
(Continued)

OTHER PUBLICATIONS

Authored by: John D. Thomerson Title of video: Pet HealthCare Innovations + NSF I-Corps Title of website: YouTube Website address: https://www.youtube.com/watch?v=9xzM-cI0T9A Published date: Dec. 12, 2021.
(Continued)

*Primary Examiner* — Morgan T Jordan
(74) *Attorney, Agent, or Firm* — Fleit Intellectual Property Law; Paul D. Bianco

(57) ABSTRACT

A mobility impaired animal potty and bladder expression station for dogs and other suitable animals. The station and its variation devices provide structural support for the dog's weight, are quick and easy to use and clean, allow a natural position for the dog to go potty, allow one person to easily express the dog's bladder with the dog standing, and aid with mobility, exercise, and rehab. The stations can be either stationary or mobile. Pet owners can either place their dog in the device or walk them into the device with a sling, harness, or hammock. The devices are adjustable to fit dogs of all sizes, the sling, harness, and hammock are removable and washable, and they maintain the dog in a stable and comfortable position. The devices are collapsible and easily storable, they are light weight, and they allow both male and female dog postures for potty.

20 Claims, 7 Drawing Sheets

(56)                References Cited

U.S. PATENT DOCUMENTS

| | | | | |
|---|---|---|---|---|
| 2,546,726 | A | * | 3/1951 | Creamer, Jr. .......... A01K 13/00 |
| | | | | 280/47.131 |
| 2,718,214 | A | | 9/1955 | Walker |
| 2,976,840 | A | | 3/1961 | Hugus |
| 3,241,851 | A | * | 3/1966 | Dingbaum ............... A61D 9/00 |
| | | | | 280/43 |
| 4,070,989 | A | * | 1/1978 | Ganzel ..................... A61D 3/00 |
| | | | | 119/728 |
| 4,428,326 | A | | 1/1984 | Dubovick et al. |
| 4,777,910 | A | * | 10/1988 | Pecor ................... A01K 15/027 |
| | | | | 119/702 |
| 4,796,565 | A | * | 1/1989 | Charbeneau ......... A01K 1/0245 |
| | | | | 119/727 |
| 4,829,937 | A | * | 5/1989 | Weelink ................. A01K 15/04 |
| | | | | 119/727 |
| 5,009,196 | A | | 4/1991 | Young |
| 5,010,850 | A | | 4/1991 | Sailer |
| 5,193,486 | A | | 3/1993 | Kitchens |
| 5,224,444 | A | * | 7/1993 | Hill .......................... A61H 3/04 |
| | | | | 119/727 |
| 5,531,187 | A | | 7/1996 | Ward |
| 5,823,146 | A | | 10/1998 | Alaniz et al. |
| 5,842,443 | A | * | 12/1998 | Steinfort .............. A01K 1/0613 |
| | | | | 119/726 |
| 6,199,508 | B1 | * | 3/2001 | Miale ....................... A61D 3/00 |
| | | | | 119/28.5 |
| 6,640,751 | B1 | | 11/2003 | Cool |
| 6,729,263 | B2 | * | 5/2004 | Miale ....................... A61D 3/00 |
| | | | | 119/28.5 |
| 6,820,572 | B1 | | 11/2004 | Parkes |
| 7,389,749 | B1 | * | 6/2008 | Choate ..................... A61D 3/00 |
| | | | | 119/726 |
| 8,038,158 | B1 | * | 10/2011 | White .................... A47D 13/08 |
| | | | | 280/87.051 |
| 8,302,565 | B2 | | 11/2012 | Williams |
| 8,459,210 | B2 | | 6/2013 | Cho |
| 8,474,412 | B1 | | 7/2013 | Walden et al. |
| 8,919,291 | B2 | * | 12/2014 | De La Celle ........ A01K 15/027 |
| | | | | 119/727 |
| 9,179,646 | B2 | * | 11/2015 | Shalom .................... A61H 3/04 |
| 9,962,249 | B2 | * | 5/2018 | Newby ................... A61D 3/00 |
| 10,765,087 | B1 | * | 9/2020 | Massey .................... A61H 3/04 |
| D919,200 | S | * | 5/2021 | Zeng ............................ D30/199 |
| 11,033,093 | B2 | * | 6/2021 | Bingener .................. A45F 3/24 |
| 12,133,509 | B2 | * | 11/2024 | Hotta ..................... A01K 29/00 |
| 12,268,192 | B1 | * | 4/2025 | Merah .................. A01K 15/027 |
| 12,290,047 | B1 | * | 5/2025 | Rosig ..................... A01K 13/00 |
| 2003/0221634 | A1 | | 12/2003 | Emerick |
| 2004/0231613 | A1 | * | 11/2004 | Parkes ................... A01K 15/00 |
| | | | | 119/727 |
| 2005/0005875 | A1 | | 1/2005 | Suggs |

| | | | | |
|---|---|---|---|---|
| 2005/0076853 | A1 | | 4/2005 | Leo |
| 2006/0156997 | A1 | | 7/2006 | Moore |
| 2007/0113798 | A1 | * | 5/2007 | Torjesen .................. A61D 3/00 |
| | | | | 119/725 |
| 2009/0101084 | A1 | | 4/2009 | Robinson et al. |
| 2009/0126650 | A1 | * | 5/2009 | Walker-Indyke ...... A01K 15/00 |
| | | | | 119/756 |
| 2012/0160184 | A1 | | 6/2012 | Lichvar |
| 2013/0055966 | A1 | | 3/2013 | Rubinstein et al. |
| 2016/0045294 | A1 | | 2/2016 | Sherman |
| 2016/0057974 | A1 | | 3/2016 | McClain |
| 2018/0242549 | A1 | | 8/2018 | Zimmerman |
| 2019/0082816 | A1 | * | 3/2019 | Nguyen ................. A47C 17/84 |
| 2019/0124890 | A1 | | 5/2019 | Kath |
| 2019/0230898 | A1 | * | 8/2019 | Cassell ................ A01K 13/003 |
| 2019/0297836 | A1 | * | 10/2019 | Roa .......................... A01K 1/06 |
| 2020/0008391 | A1 | * | 1/2020 | Fofana .................. A01K 15/02 |
| 2020/0260845 | A1 | * | 8/2020 | Bingener .................. A45F 3/24 |
| 2021/0153476 | A1 | | 5/2021 | Richards |
| 2021/0259212 | A1 | * | 8/2021 | Meneou, II .......... A01K 27/003 |
| 2023/0016912 | A1 | * | 1/2023 | Cook ..................... B62B 17/061 |
| 2024/0285384 | A1 | * | 8/2024 | Peacock Gallagher .. A61D 3/00 |
| 2024/0341266 | A1 | * | 10/2024 | Thomerson .......... A01K 1/0263 |

FOREIGN PATENT DOCUMENTS

| | | | | |
|---|---|---|---|---|
| DE | 10343357 | B4 | * | 4/2017 | ............... A61D 9/00 |
| JP | 2005000022 | A | | 1/2005 |
| JP | 2015-221017 | A | | 12/2015 |
| JP | 6381290 | B2 | | 8/2018 |
| KR | 20 2018 0002811 | U | | 10/2018 |
| WO | WO-9001910 | A1 | * | 3/1990 | ........... A01K 1/0613 |

OTHER PUBLICATIONS

Co-authored by: Melissa Nelson DVM, PhD Title of article: How to Express a Paralyzed Dog's Bladder Title of website: wikiHow Website address: https://www.wikihow.com/Express-a-Paralyzed-Dog%27s-Bladder Last updated date: Jan. 2, 2024.

Authored by (user name): Rhapsodyshao Title of article: Station for expressing a large paralyzed dog's bladder Title of website: Walkin' Pets Forum Website address: https://handicappedpet.net/helppets/viewtopic.php?t=9550 Last updated date: Sep. 5, 2007.

Authored by: Walkin' Pets Title of article: Expressing Your Dog's Bladder Title of website: Walkin' Pets Website address: https://www.walkinpets.com/how-to-express-your-dogs-bladder/ Last updated date: Unknown.

Authored by: Walkin' Pets Blog Title of article: Tips on How to Express Your Dog's Bladder Title of website: Walkin' Pets Blog Website address: https://www.walkinpets.com/blog/how-to-express-dog-bladder/ Last updated date: Oct. 27, 2023.

* cited by examiner

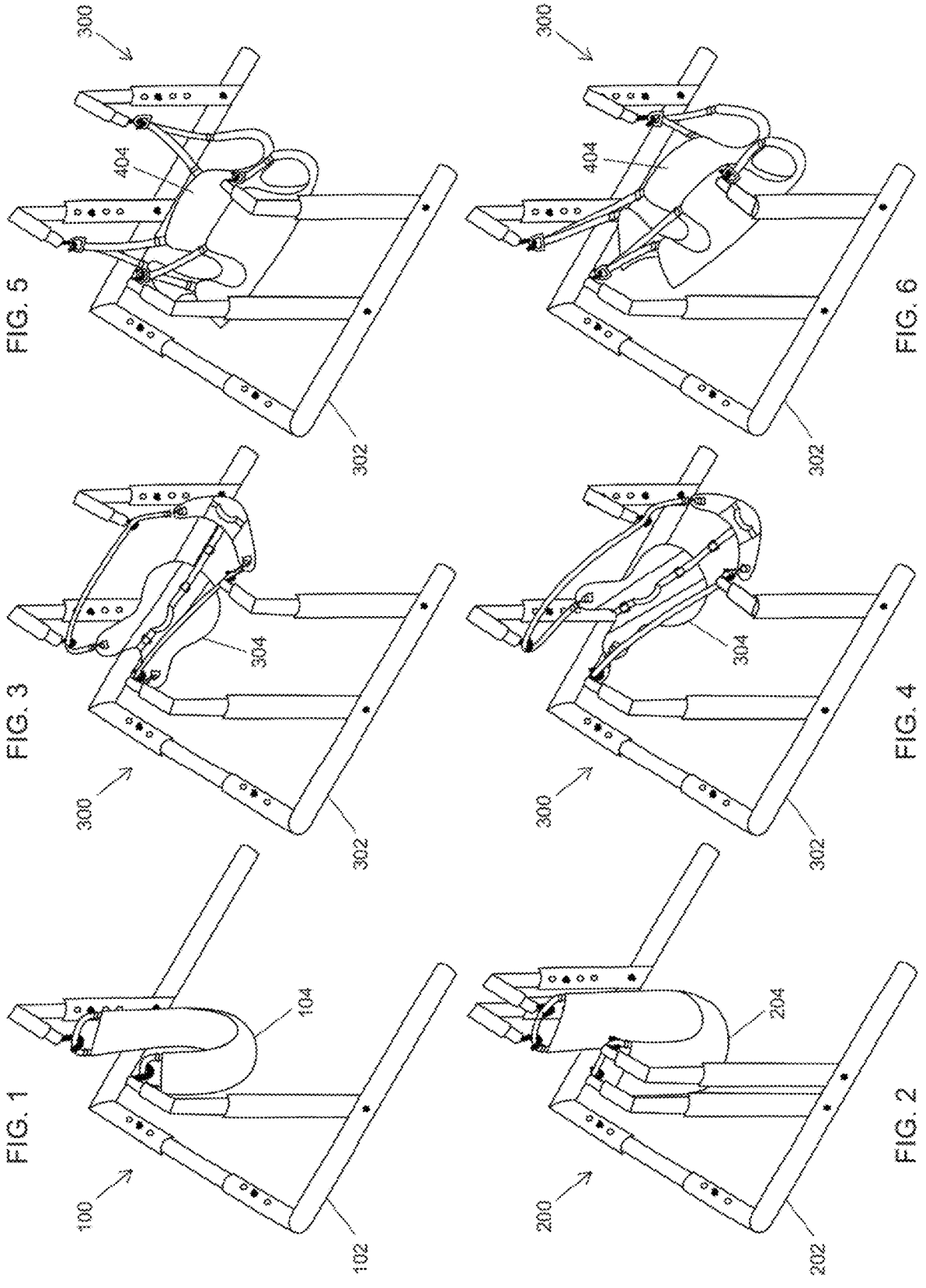

1.) Unload Weight With Handles/Straps

2.) Rotate D Rings To Secure Position

MOBILITY IMPAIRED ANIMAL POTTY AND BLADDER EXPRESSION STATION

FIELD OF THE INVENTION

The invention relates to animal support structures, mobility and walking aids, and related areas and uses such as assistive devices for animal potty and bladder expression.

BACKGROUND

It has been estimated that in the US alone, 14 million dogs each year or 16% of dogs that see a veterinarian each year suffer from a medical condition that results in either their inability to support their own weight or mobility impairment, necessitating owners to hold them up for potty, their need for bladder expression, or requiring assistance with mobility. These activities are messy, time consuming, frustrating, and have a high risk of injury for both the dog and the owner. Approximately 4,640,000 dogs are euthanized each year, in the US alone, because they have mobility impairment or need bladder expression.

Currently, owners of pets that have mobility impairment or need assistance to urinate or defecate have limited options. Diapers or potty pads do not assist with mobility and are messy. Harnesses and slings are cumbersome to use and also do not support the animal's weight. Although wheelchairs assist with mobility and are weight supporting, bladder expression and aiding defecation, as well as rehabilitation and other procedures, can be difficult.

There therefore exists a need for an improved mobility impaired animal potty and bladder expression station, in both a stationary form, as well as a mobile form that also assists with mobility.

SUMMARY OF THE INVENTION

A device for assisting animal waste evacuation or bladder expression comprises a frame configured and dimensioned so that at least a portion of the animal is positionable in the frame; and a support device operatively associated with the frame for supporting at least part of the animal's weight during waste evacuation or bladder expression. The support device is a sling, harness, or hammock and the frame has a length, width, and height, with each of the length, the width, and the height adjustable to accommodate animals of different size and to adjust support of the animal provided by the support device.

The frame comprises a base with first and second legs connected to each other at one end by a crossbar such that an open area at the end of the base opposite the crossbar is configured and dimensioned so that at least a portion of the animal is positionable in the open area. The first and second legs are adjustable in length to provide the frame length adjustability. At least one of the first and second legs is movable laterally relative to the crossbar to provide the frame width adjustability.

The base further comprises at least one support post extending from the first leg and at least one support post extending from the second leg for coupling the support device to the frame. The at least one support post extending from the first leg and the at least one support post extending from the second leg each is adjustable in length to provide the frame height adjustability.

In some embodiments, the at least one support post extending from the first leg comprises a first support post and the at least one support post extending from the second leg comprises a second support post. The first support post and the second support post are located at approximately the same distance from the crossbar. An end of the first support post can include a first attachment member and an end of the second support post can include a second attachment member, the first and second attachment members removably coupling the support device to the frame. At least one of the first and second attachment members can be a carabiner.

Additionally, a first lateral extension can extend from the first support post and a second lateral extension can extend from the second support post, with each of the first and second lateral extensions adjustable in length so that a distance between the first and second lateral extensions is adjustable to alter support of the support device. An end of the first lateral extension can include a first attachment member and an end of the second lateral extension can include a second attachment member, with the first and second attachment members removably coupling the support device to the frame.

In some embodiments, the at least one support post extending from the first leg comprises a first front support post and a first rear support post; and the at least one support post extending from the second leg comprises a second front support post and a second rear support post. The first front support post and the second front support post are located at approximately the same distance from the crossbar and the first rear support post and the second rear support post are located at approximately the same distance from the crossbar.

An end of each of the first front support post, first rear support post, second front support post, and second rear support post can include an attachment member for removably coupling the harness or hammock to the frame. The attachment member can be a carabiner.

A first front lateral extension can extend from the first front support post, a first rear lateral extension can extend from the first rear support post, a second front lateral extension can extend from the second front support post, and a second rear lateral extension can extend from the second rear support post. Each of the first front and second front lateral extensions is adjustable in length so that a distance between the first front and second front lateral extensions adjustable. Each of the first rear and second rear lateral extensions is adjustable in length so that a distance between the first rear and second rear lateral extensions is adjustable to alter support of the support device.

An end of each of the first front lateral extension, first rear lateral extension, second front lateral extension, and second rear lateral extension can include an attachment member for removably coupling the harness or hammock to the frame. The height of the first front support post and the second front support post can be adjusted to be greater than the height of the first rear support post and second rear support post to position an animal in the frame in a squatting posture.

In this regard, the device can further comprise a first squat extension strap with first and second ends removably attachable to the attachment member of the first rear lateral extension and a second squat extension strap with first and second ends removably attachable to the attachment member of the second rear lateral extension. In a first configuration, the first and second ends of the first squat extension straps are both attached to the attachment member of the first rear lateral extension and the first and second ends of the second squat extension straps are both attached to the attachment member of the second rear lateral extension. In a second configuration, only one of the first and second ends of the first squat extension straps is attached to the attachment member of the first rear lateral extension and only one of the first and second ends of the second squat extension straps is attached to the attachment member of the second rear lateral extension.

In some embodiments, the base further comprises a first front vertical post extending from the first leg or crossbar, a first rear vertical post extending from the first leg or crossbar, a second front vertical post extending from the second leg or crossbar, and a second rear vertical post extending from the second leg or crossbar. Each of the first front vertical post, first rear vertical post, second front vertical post, and second rear vertical post is adjustable in length to provide the frame height adjustability. Additionally, wheels can be provided to facilitate mobility of the device.

BRIEF DESCRIPTION OF THE DRAWINGS

A more complete understanding of the present disclosure, and the attendant advantages and features thereof, will be more readily understood by reference to the following description when considered in conjunction with the accompanying drawings wherein:

FIG. 1 shows a first embodiment of the device according to the invention.

FIG. 2 shows a second embodiment of the device according to the invention.

FIG. 3 shows a third embodiment of the device according to the invention in which an animal would be in a standing posture.

FIG. 4 shows the device of FIG. 3 in which an animal would be in a squatting posture.

FIG. 5 shows a fourth embodiment of the device according to the invention in which an animal would be in a standing posture.

FIG. 6 shows the device of FIG. 5 in which an animal would be in a squatting posture.

DETAILED DESCRIPTION

Figure 7:
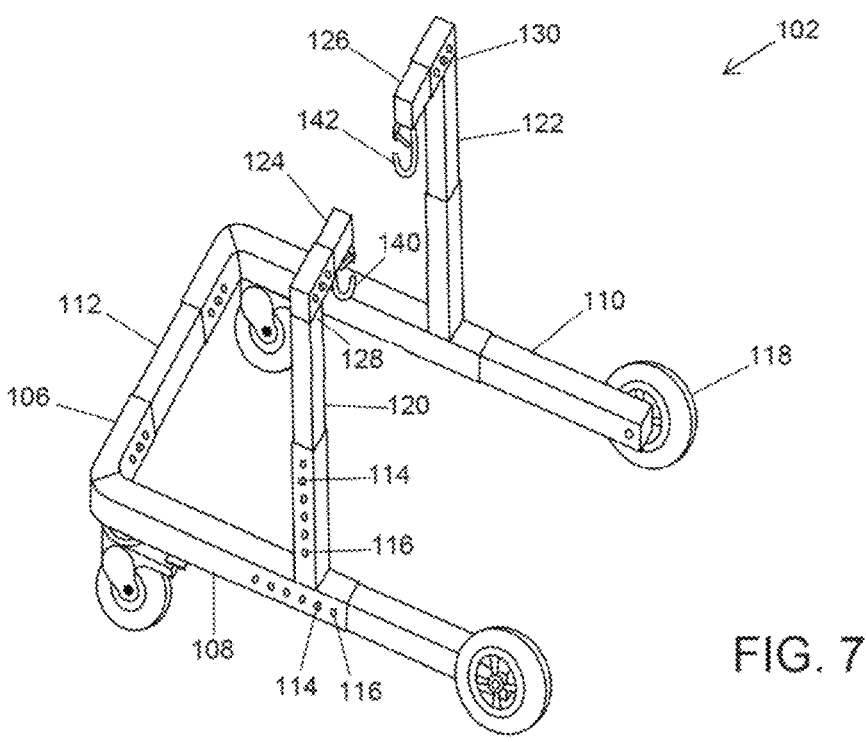
FIG. 7 shows a frame of the device of FIG. 1.

As required, embodiments are disclosed herein; however, it is to be understood that the disclosed embodiments are merely examples and that the devices and methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise.

The term "plurality", as used herein, is defined as two or more than two. The term "another", as used herein, is defined as at least a second or more. The term "coupled," as used herein, is defined as "connected," although not necessarily directly, and not necessarily mechanically.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skilled in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described in the general description or the examples are required, that a portion of a specific activity may not be required, and that one or more further activities can be performed in addition to those described. Still further, the order in which activities are listed are not necessarily the order in which they are performed.

Overview

In general, the invention relates to mobility impaired animal potty and bladder expression station. Although the description provided herein focuses mainly on dogs, the invention contemplates use for any other suitable animal such as a cat, as well as for use for humans. The disclosed devices provide structural support for the dog's weight, are quick and easy to use and clean, allow a natural position for the dog to go potty, allow one person to easily express the dog's bladder with the dog standing, and provide assistance with mobility, exercise, and rehab. This results in less euthanasia, longer lifespan, and healthier, cleaner, faster, easier, and more affordable potty sessions and care for the dog.

The disclosed devices come in both stationary and mobile versions. Pet owners can either place their dog in the device or walk them into the device with a sling, harness, or hammock. The devices are adjustable to fit dogs of all sizes, the sling, harness, and hammock are removable and washable, and they maintain the dog in a stable and comfortable position. The devices are collapsible and easily storable, they are light weight, and they allow both male and female dog postures for potty. Mobile versions of the devices aid in mobility, and can be provided with a handle for pushing and pulling and lockable wheels.

FIGS. 1-6 show different embodiments of the invention, which will now be described generally and in more detail below. FIG. 1 shows a device 100 comprising a frame 102 and a sling 104 which supports the dog when using device 100. In FIG. 2, a device 200 also includes a frame 202 and a sling 204. Frame 202 includes four attachment points for sling 204 while frame 100 includes two attachment points for sling 104. Devices 100, 200 as well as other devices disclosed herein allow the dog to be placed on sling 104 (or walked into frame 102, 202, possibly with the assistance of sling 104) in a standing posture, from which the dog can urinate, defecate, or have its bladder expressed (particular if the dog is a male). If the sling is rotated towards the head of the dog while the dog is supported by the sling, the dog will be moved into a squatting posture, from which the dog can urinate, defecate, or have its bladder expressed (particularly if the dog is a female). As is evident from FIGS. 1 and 2, sling 104, 204 supports an animal that is held up by frame 102, 202, which acts as a support structure and provides unobstructed entry from the top and front with no additional attachments (harnesses/similar) required, making it very easy to use.

FIGS. 3 and 4 show a device 300 comprising a frame 302 and a harness 304. FIGS. 5 and 6 show device 300 with a hammock 404 coupled to frame 302. In FIGS. 3 and 5, the dog will be in a standing posture and in FIGS. 4 and 6, the dog will be in a squatting posture. Different structures and techniques of walking or positioning the dog into device 300 as well as achieving the squatting posture are described below. As is evident from FIGS. 3-6, harness 304 or hammock 404 supports an animal that is held up by frame 302, which acts as a support structure and provides unobstructed entry from the top and front with no additional attachments (harnesses/similar) required, making it very easy to use.

Frames 102, 202, 302 as well as the other frames disclosed herein can be made of any suitable material that has sufficient strength such as metals, polymers, and composites.

Slings 104, 204; harness 304; and hammock 404 can be made of any suitable material that has sufficient strength to support the dog without undue discomfort and is washable or otherwise cleanable.

Frames

Turning now to FIG. 7 and with reference to FIG. 1, frame 102 of device 100 has a base 106 with legs 108, 110 connected to each other at one end by crossbar 112. The open area at the end of base 106 opposite crossbar 112 allows the dog to walk into or be positioned in frame 102. If desired, a potty pad can also be placed inside frame 102. Each of legs 108, 110 is telescopic or otherwise adjustable in length to accommodate dogs of different lengths and to facilitate positioning of the dog relative to the sling, harness, or hammock. Although FIG. 7 shows the length adjustment in discrete increments, the present invention contemplates adjustability along a continuum. Additionally, mechanisms other than spring loaded nubs 114 which engage in holes 116 to fix the length as desired are also contemplated by the present invention.

At least one of legs 108, 110 is movable laterally relative to crossbar 112, making frame 102 adjustable in width to accommodate dogs of different widths and to facilitate positioning of the dog relative to the sling, harness, or hammock. Although FIG. 7 shows the width adjustment in discrete increments, the present invention contemplates adjustability along a continuum. Additionally, mechanisms other than spring loaded nubs 114 which engage in holes 116 to fix the width as desired are also contemplated by the present invention.

Wheels 118 can optionally be provided for mobility of device 100. FIG. 1 shows device 100 without wheels and FIG. 7 shows device 100 with wheels 118. Wheels 118 can be permanently fixed to frame 102 or removably attached to frame 102. At least one of wheels 118 can have a locking mechanism to prevent or hinder rotation.

Base 106 also includes support posts 120, 122, with support post 120 extending from leg 108 and support post 122 extending from leg 110. In some embodiments, support posts 120, 122 are permanently fixed (or integral to) legs 108, 110. In other embodiments, support posts 120, 122 are removably attached to legs 108, 110 to facilitate transport of device 100 by making frame 102 more collapsible. In this regard, the attachment may also be via rotational component (s) that allows legs 108, 110 to remain attached but rotate to a collapsed position.

As shown in FIG. 1, support posts 120, 122 support sling 104. Each of support posts 120, 122 is telescopic or otherwise adjustable in length to accommodate dogs of different heights and to facilitate positioning of the dog relative to the sling, harness, or hammock. Although FIG. 7 shows the length adjustment in discrete increments, the present invention contemplates adjustability along a continuum. Additionally, mechanisms other than spring loaded nubs 114 which engage in holes 116 to fix the height as desired are also contemplated by the present invention.

In exemplary embodiments, such as shown in FIGS. 1 and 7, support post 120 includes a lateral extension 124 and support post 122 includes a lateral extension 126. Lateral extensions 124, 126 allow base 106 to have sufficient width to facilitate movement of the dog in and out of frame 102 as well as to accommodate dogs whose legs spread outward when picked up, for example. Additionally, lateral extensions 124, 126 bring sling 104 to fit closer around the dog thereby improving lateral stability. In the embodiment shown in FIG. 1, lateral extensions 124, 126 are not adjustable. In the embodiment shown in FIG. 7, lateral extensions 124, 126 are adjustable so that the distance between lateral extensions 124, 126 can be changed. This adjustability further improves lateral stability, to reduce side-to-side movement of the dog, which is particularly important for dogs with spinal injuries. Although FIG. 7 shows the adjustment in discrete increments, the present invention contemplates adjustability along a continuum. Additionally, mechanisms other than spring loaded nubs 114 which engage in holes 116 to fix the distance between lateral extensions 124, 126 as desired are also contemplated by the present invention.

An end portion 128 of support post 120 includes an attachment member 140. If support post 120 includes lateral extension 124, attachment member 140 can be provided on lateral extension 124. Similarly, an end portion 130 of support post 122 includes an attachment member 142. If support post 122 includes lateral extension 126, attachment member 142 can be provided on lateral extension 126. Attachment members 140, 142 are for coupling and uncoupling sling 104 to frame 102. Different embodiments of attachment members 140, 142 are disclosed below.

Figure 8:
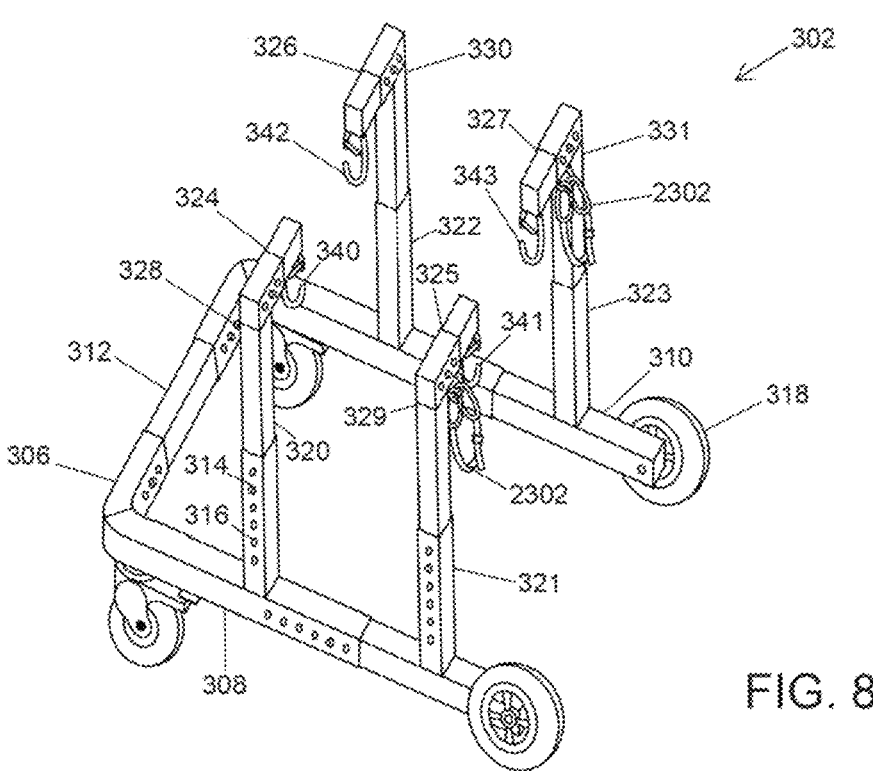
FIG. 8 shows a frame of the devices of FIGS. 3-6.

Turning now to FIG. 8 and also with reference to FIGS. 3-6, frame 302 of device 300 has a base 306 with legs 308, 310 connected to each other at one end by crossbar 312. The open area at the end of base 306 opposite crossbar 312 allows the dog to walk into or be positioned in frame 302. If desired, a potty pad can also be placed inside frame 302. Each of legs 308, 310 is telescopic or otherwise adjustable in length to accommodate dogs of different lengths and to facilitate positioning of the dog relative to the sling, harness, or hammock. Although FIG. 8 shows the length adjustment in discrete increments, the present invention contemplates adjustability along a continuum. Additionally, mechanisms other than spring loaded nubs 314 which engage in holes 316 to fix the length as desired are also contemplated by the present invention.

At least one of legs 308, 310 is movable laterally relative to crossbar 312, making frame 302 adjustable in width to accommodate dogs of different widths and to facilitate positioning of the dog relative to the sling, harness, or hammock. Although FIG. 8 shows the width adjustment in discrete increments, the present invention contemplates adjustability along a continuum. Additionally, mechanisms other than spring loaded nubs 314 which engage in holes 316 to fix the width as desired are also contemplated by the present invention.

Wheels 318 can optionally be provided for mobility of device 300. FIGS. 3-6 show device 300 without wheels and FIG. 8 shows device 300 with wheels 318. Wheels 318 can be permanently fixed to frame 302 or removably attached to frame 302. At least one of wheels 318 can have a locking mechanism to prevent or hinder rotation.

Base 306 also includes support posts 320, 321, 322, 323 with support posts 320, 321 extending from leg 308 and support posts 322, 323 extending from leg 310. Support posts 320, 322 are positioned as front support posts and support posts 321, 323 are positioned as rear support posts. In some embodiments, support posts 320, 321, 322, 323 are permanently fixed (or integral to) legs 308, 310. In other embodiments, at least one of support posts 320, 321, 322, 323 is removably attached to legs 308, 310 to facilitate transport of device 300 by making frame 302 more collapsible. In this regard, the attachment may also be via rotational component(s) that allows legs 308, 310 to remain attached but rotate to a collapsed position.

As shown in FIGS. 3-6, support posts 320, 321, 322, 323 support harness 304 or hammock 404. The current invention contemplates that a sling could be used instead of harness 304 or hammock 404. Each of support posts 320, 321, 322, 323 is telescopic or otherwise adjustable in length to accommodate dogs of different heights and to facilitate positioning of the dog relative to the sling, harness, or hammock. Although FIG. 8 shows the length adjustment in discrete increments, the present invention contemplates adjustability along a continuum. Additionally, mechanisms other than spring loaded nubs 314 which engage in holes 316 to fix the height as desired are also contemplated by the present invention.

In exemplary embodiments, such as shown in FIGS. 3-6 and 8, support post 320 includes a lateral extension 324, support post 321 includes a lateral extension 325, support post 322 includes a lateral extension 326, and support post 323 includes a lateral extension 327. Lateral extensions 324, 325, 326, 327 allow base 306 to have sufficient width to facilitate movement of the dog in and out of frame 302 as well as to accommodate dogs whose legs spread outward when picked up, for example. Additionally, lateral extensions 324, 325, 326, 327 bring harness 304 to fit closer around the dog thereby improving lateral stability. In the embodiment shown in FIGS. 3-6, lateral extensions 324, 325, 326, 327 are not adjustable. In the embodiment shown in FIG. 8, lateral extensions 324, 325, 326, 327 are adjustable so that the distance between lateral extensions 324, 326 (the front lateral extensions) and the distance between lateral extensions 325, 327 (the back lateral extensions) can be changed. This adjustability further improves lateral stability, to reduce side-to-side movement of the dog, which is particularly important for dogs with spinal injuries. Although FIG. 8 shows the adjustment in discrete increments, the present invention contemplates adjustability along a continuum. Additionally, mechanisms other than spring loaded nubs 314 which engage in holes 316 to fix the distance between lateral extensions 324, 326 and the distance between lateral extensions 325, 327 as desired are also contemplated by the present invention.

An end portion 328 of support post 320 includes an attachment member 340. If support post 320 includes lateral extension 324, attachment member 340 can be provided on lateral extension 324. Similarly, an end portion 329 of support post 321 includes an attachment member 341. If support post 321 includes lateral extension 325, attachment member 341 can be provided on lateral extension 325. Similarly, an end portion 330 of support post 322 includes an attachment member 342. If support post 322 includes lateral extension 326, attachment member 342 can be provided on lateral extension 326. Similarly, an end portion 331 of support post 323 includes an attachment member 343. If support post 323 includes lateral extension 327, attachment member 343 can be provided on lateral extension 327. Attachment members 340, 341, 342, 343 are for coupling and uncoupling harness 304 (or a sling or hammock) to frame 302. Different embodiments of attachment members 340, 341, 342, 343 are disclosed below.

Figure 9:
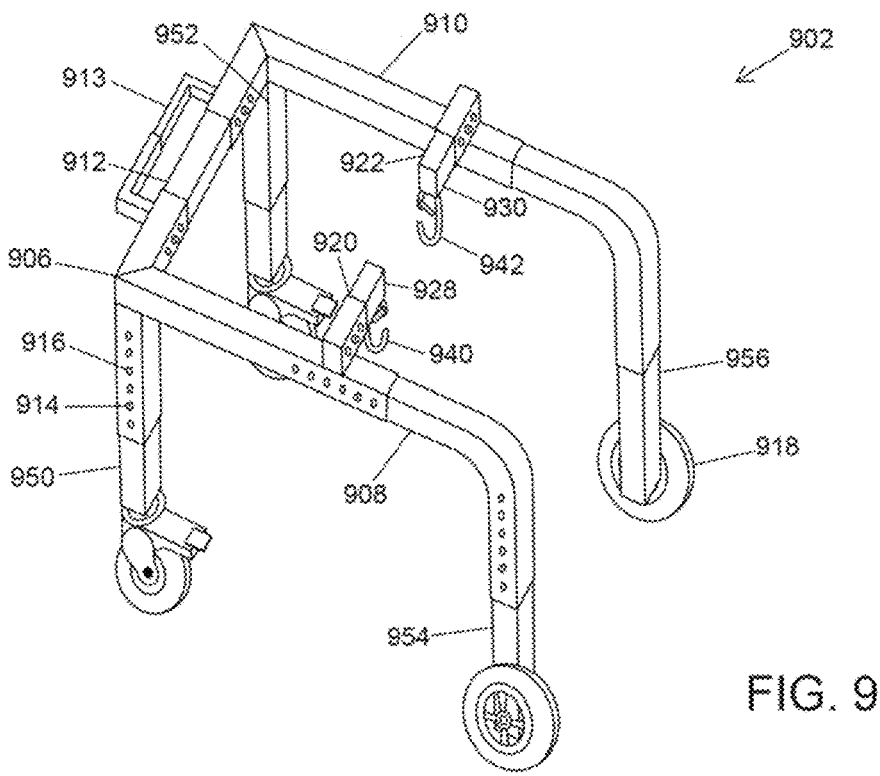
FIG. 9 shows another embodiment of a frame.
Figure 10:
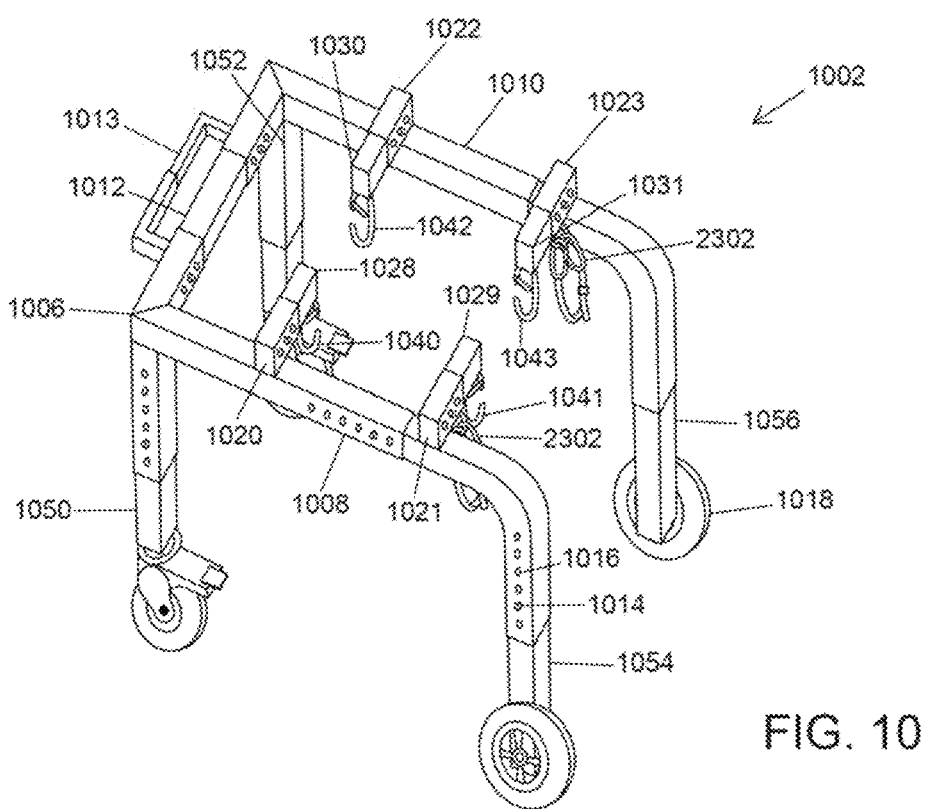
FIG. 10 shows another embodiment of a frame.

In FIGS. 1-8, the crossbar is located at the bottom, i.e. ground height. This provides more stability along the bottom, but potentially less support along the top, particularly for the support posts. Additionally, positioning the crossbar at the bottom places it out of the line of sight of the dog, which may facilitate entry. FIGS. 9 and 10 show embodiments with the crossbar at the top, which provides more stability along the top and increased support for the support posts, but potentially less stability along the bottom. The present invention also contemplates that the cross bar can be attached in between the top and bottom. Further, the cross bar may be attached at the front end as shown or may be attached at the back end or in between. Additionally, there may be one or more cross bars used. Finally, the cross bars may be of linear shape, curved, or triangular.

In FIG. 9, frame 902 has a base 906 with legs 908, 910 connected to each other at one end by crossbar 912. Optionally, a handle 913 is integral to, permanently attached, or removably attached to crossbar 912. If included, handle 913 could alternatively be on other portions of frame 902. A handle analogous to handle 913 could also be included in any of the other frames disclosed herein. In this regard, handle 913 is shown extending outward from crossbar 912, but could alternatively extend upward from crossbar 912.

The open area at the end of base 906 opposite crossbar 912 allows the dog to walk into or be positioned in frame 902. If desired, a potty pad can also be placed inside frame 902. Each of legs 908, 910 is telescopic or otherwise adjustable in length to accommodate dogs of different lengths and to facilitate positioning of the dog relative to the sling, harness, or hammock. Although FIG. 9 shows the length adjustment in discrete increments, the present invention contemplates adjustability along a continuum. Additionally, mechanisms other than spring loaded nubs 914 which engage in holes 916 to fix the length as desired are also contemplated by the present invention.

At least one of legs 908, 910 is movable laterally relative to crossbar 912, making frame 902 adjustable in width to accommodate dogs of different widths and to facilitate positioning of the dog relative to the sling, harness, or hammock. Although FIG. 9 shows the width adjustment in discrete increments, the present invention contemplates adjustability along a continuum. Additionally, mechanisms other than spring loaded nubs 914 which engage in holes 916 to fix the width as desired are also contemplated by the present invention.

Base 906 also includes vertical posts 950, 952, 954, 956 extending from legs 908, 910 and/or crossbar 912. In some embodiments, vertical posts 950, 952, 954, 956 are permanently fixed (or integral to) legs 908, 910 and/or crossbar 912. In other embodiments, vertical posts 950, 952, 954, 956 are removably attached to legs 908, 910 and/or crossbar 912 to facilitate transport by making frame 902 more collapsible. In this regard, the attachment may also be via rotational component(s) that allows vertical posts 950, 952, 954, 956 to remain attached but rotate to a collapsed position.

Each of vertical posts 950, 952, 954, 956 is telescopic or otherwise adjustable in length to accommodate dogs of different heights and to facilitate positioning of the dog relative to the sling, harness, or hammock. Although FIG. 9 shows the length adjustment in discrete increments, the present invention contemplates adjustability along a continuum. Additionally, mechanisms other than spring loaded nubs 914 which engage in holes 916 to fix the height as desired are also contemplated by the present invention.

Wheels 918 can optionally be provided at the ends of vertical posts 950, 952, 954, 956 for mobility of frame 902. Wheels 918 can be permanently fixed to vertical posts 950, 952, 954, 956 or removably attached to vertical posts 950, 952, 954, 956. At least one of wheels 918 can have a locking mechanism to prevent or hinder rotation.

Base 906 also includes support posts 920, 922, with support post 920 extending from leg 908 and support post 922 extending from leg 910. In some embodiments, support posts 920, 922 are permanently fixed (or integral to) legs 908, 910. In other embodiments, support posts 920, 922 are removably attached to legs 908, 910. Analogous to previous embodiments, support posts 920, 922 support a sling, harness, or hammock.

The inclusion of support posts is optional since the sling, harness, or hammock can be coupled directly to legs 908, 910. However, the inclusion of support posts 920, 922 allows base 906 to have sufficient width to facilitate movement of the dog in and out of frame 902 as well as to accommodate dogs whose legs spread outward when picked up, for example. Additionally, support posts 920, 922 bring the sling, harness, or hammock to fit closer around the dog thereby improving lateral stability. In some embodiments, the distance between the ends of support posts 920, 922 is not adjustable. In the embodiment shown in FIG. 9, support posts 920, 922 are adjustable so that the distance between support posts 920, 922 can be changed. This adjustability further improves lateral stability, to reduce side-to-side movement of the dog, which is particularly important for dogs with spinal injuries. Although FIG. 9 shows the adjustment in discrete increments, the present invention contemplates adjustability along a continuum. Additionally, mechanisms other than spring loaded nubs 914 which engage in holes 916 to fix the distance between support posts 920, 922 as desired are also contemplated by the present invention.

An end portion 928 of support post 920 includes an attachment member 940. Similarly, an end portion 930 of support post 922 includes an attachment member 942. In embodiments without support posts 920, 922, attachment member 940 is included on leg 908 and attachment member 942 is included on leg 910. Attachment members 940, 942 are for coupling and uncoupling the sling, harness, or hammock to frame 902. Different embodiments of attachment members 940, 942 are disclosed below.

In FIG. 10, frame 1002 has a base 1006 with legs 1008, 1010 connected to each other at one end by crossbar 1012. Optionally, a handle 1013 is integral to, permanently attached, or removably attached to crossbar 1012. If included, handle 1013 could alternatively be on other portions of frame 1002. A handle analogous to handle 1013 could also be included in any of the other frames disclosed herein. In this regard, handle 1013 is shown extending outward from crossbar 1012, but could alternatively extend upward from crossbar 1012.

The open area at the end of base 1006 opposite crossbar 1012 allows the dog to walk into or be positioned in frame 1002. If desired, a potty pad can also be placed inside frame 1002. Each of legs 1008, 1010 is telescopic or otherwise adjustable in length to accommodate dogs of different lengths and to facilitate positioning of the dog relative to the sling, harness, or hammock. Although FIG. 10 shows the length adjustment in discrete increments, the present invention contemplates adjustability along a continuum. Additionally, mechanisms other than spring loaded nubs 1014 which engage in holes 1016 to fix the length as desired are also contemplated by the present invention.

At least one of legs 1008, 1010 is movable laterally relative to crossbar 1012, making frame 1002 adjustable in width to accommodate dogs of different widths and to facilitate positioning of the dog relative to the sling, harness, or hammock. Although FIG. 10 shows the width adjustment in discrete increments, the present invention contemplates adjustability along a continuum. Additionally, mechanisms other than spring loaded nubs 1014 which engage in holes 1016 to fix the width as desired are also contemplated by the present invention.

Base 1006 also includes vertical posts 1050, 1052, 1054, 1056 extending from legs 1008, 1010 and/or crossbar 1012.

In some embodiments, vertical posts 1050, 1052, 1054, 1056 are permanently fixed (or integral to) legs 1008, 1010 and/or crossbar 1012. In other embodiments, vertical posts 1050, 1052, 1054, 1056 are removably attached to legs 1008, 1010 and/or crossbar 1012 to facilitate transport by making frame 1002 more collapsible. In this regard, the attachment may also be via rotational component(s) that allows vertical posts 1050, 1052, 1054, 1056 to remain attached but rotate to a collapsed position.

Each of vertical posts 1050, 1052, 1054, 1056 is telescopic or otherwise adjustable in length to accommodate dogs of different heights and to facilitate positioning of the dog relative to the sling, harness, or hammock. Although FIG. 10 shows the length adjustment in discrete increments, the present invention contemplates adjustability along a continuum. Additionally, mechanisms other than spring loaded nubs 1014 which engage in holes 1016 to fix the height as desired are also contemplated by the present invention.

Wheels 1018 can optionally be provided at the ends of vertical posts 1050, 1052, 1054, 1056 for mobility of frame 1002. Wheels 1018 can be permanently fixed to vertical posts 1050, 1052, 1054, 1056 or removably attached to vertical posts 1050, 1052, 1054, 1056. At least one of wheels 18 can have a locking mechanism to prevent or hinder rotation.

Base 1006 also includes support posts 1020, 1021, 1022, 1023 with support posts 1020, 1021 extending from leg 1008 and support posts 1022, 1023 extending from leg 1010. Support posts 1020, 1022 are positioned as front support posts and support posts 1021, 1023 are positioned as rear support posts. In some embodiments, support posts 1020, 1021, 1022, 1023 are permanently fixed (or integral to) legs 1008, 1010. In other embodiments, at least one of support posts 1020, 1021, 1022, 1023 is removably attached to legs 1008, 1010 to facilitate transport by making frame 1002 more collapsible. Analogous to previous embodiments, support posts 1020, 1021, 1022, 1023 support a sling, harness, or hammock.

The inclusion of support posts is optional since the sling, harness, or hammock can be coupled directly to legs 1008, 1010. However, the inclusion of support posts 1020, 1021, 1022, 1023 allows base 1006 to have sufficient width to facilitate movement of the dog in and out of frame 1002 as well as to accommodate dogs whose legs spread outward when picked up, for example. Additionally, support posts 1020, 1021, 1022, 1023 bring the sling, harness, or hammock to fit closer around the dog thereby improving lateral stability.

In some embodiments, the distance between the ends of support posts 1020, 1022 and the distance between the ends of support posts 1021, 1023 are not adjustable. In the embodiment shown in FIG. 10, support posts 1020, 1021, 1022, 1023 are adjustable so that the distance between the ends of support posts 1020, 1022 and the distance between the ends of support posts 1021, 1023 can be changed. This adjustability further improves lateral stability, to reduce side-to-side movement of the dog, which is particularly important for dogs with spinal injuries. Although FIG. 10 shows the adjustment in discrete increments, the present invention contemplates adjustability along a continuum. Additionally, mechanisms other than spring loaded nubs 1014 which engage in holes 1016 to fix the distance between the ends of support posts 1020, 1022 and the distance between the ends of support posts 1021, 1023 as desired are also contemplated by the present invention.

An end portion 1028 of support post 1020 includes an attachment member 1040. Similarly, an end portion 1029 of support post 1021 includes an attachment member 1041. Similarly, an end portion 1030 of support post 1022 includes an attachment member 1042. Similarly, an end portion 1031 of support post 1023 includes an attachment member 1043. In embodiments without support posts 1020, 1021, 1022, 1023, attachment members 1040, 1041 are included on leg 1008 and attachment members 942, 943 are included on leg 1010. Attachment members 1040, 1041, 1042, 1043 are for coupling and uncoupling the sling, harness, or hammock to frame 1002. Different embodiments of attachment members 1040, 1041, 1042, 1043 are disclosed below.

Figure 11:
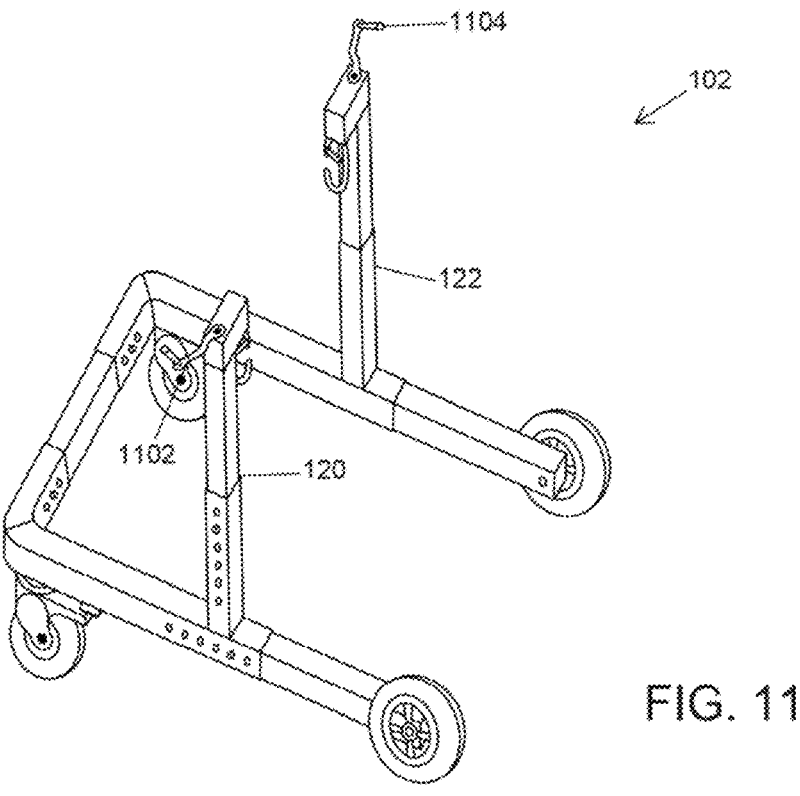
FIG. 11 shows an embodiment of a frame with manually operated cranks for changing the height of the support posts or attachment members.
Figure 12:
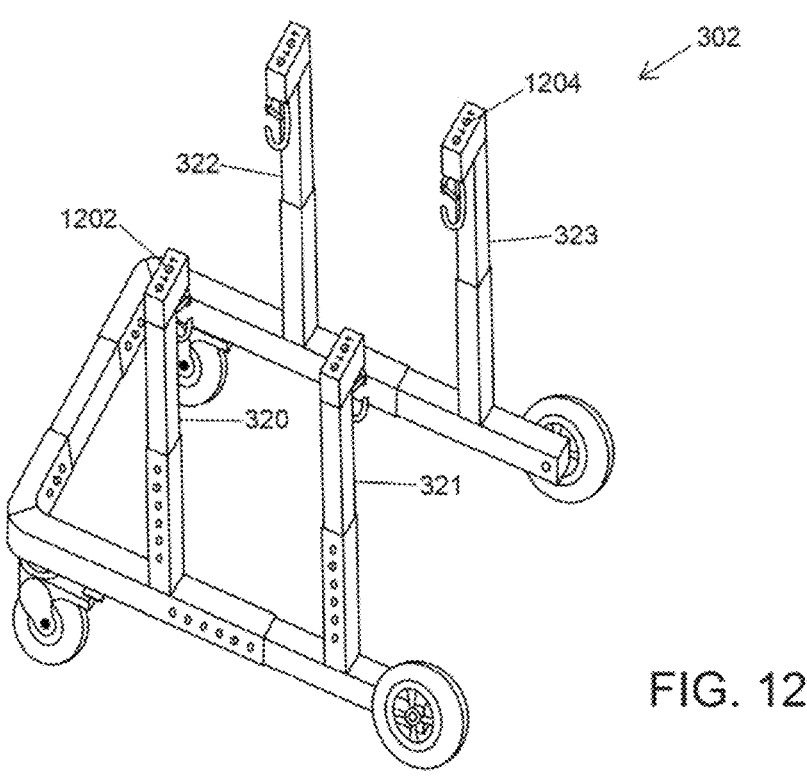
FIG. 12 shows an embodiment of a frame with motorized lifts for changing the height of the support posts or attachment members.

As previously noted, each of frames 102, 202, 302, 902, 1002 is adjustable in height, width, and length. Additionally, the distance between opposing support posts is also adjustable. As readily apparent to one of ordinary skill, the adjustability can be achieved with different mechanical and electro-mechanical mechanisms. FIG. 11 shows frame 102 with a manually operated crank 1102 for changing the height of support post 120 and a manually operated crank 1104 for changing the height of support post 122. FIG. 12 shows frame 302 with a motorized lift 1202 for changing the height of support posts 320, 322 and a motorized lift 1204 for changing the height of support posts 321, 323. Since motorized lift 1202 and motorized lift 1204 operate independently of one another, the front and rear heights can be made different, which is particularly useful in promoting a squatting posture. The manually and motorized mechanisms shown in FIGS. 11 and 12 can adapted for use in any of the frames disclosed herein as well as for adjustments of width, length, and distance between support posts.

As also readily apparent to one of ordinary skill, frames 102, 202, 302, 902, 1002 can be made to collapse to a flat configuration for ease of transportation and storage.

Attachment Members, Slings, Harnesses, and Hammocks

In some applications (particularly useful for small or medium sized dogs), the animal is placed in the device. This is known as the place method. Specifically, the user picks the dog up and places the dog into the device, which has the sling, harness, or hammock already coupled to the frame. In other applications (particularly useful for larger dogs and/or if the human user is not able to lift and place the dog in the device), the user employs the sling, harness, or hammock as an assistive device to assist the dog to walk (for dogs with no mobility limitations or mobility impairments that allow the dog to walk with the owner's help) to the frame, which does not have the sling, harness, or hammock coupled to it. The handles or straps of the sling, harness, or hammock are then coupled with the attachment members. This is known as the dock method.

A sling or hammock can be used for either the place or dock method. Although a harness can also be used for either the place or dock method, the use of a harness is particularly well-suited for the dock method since a dog typically already wears a harness.

Regardless of whether the place or dock method is used and whether a sling, harness, or hammock is used, the present invention contemplates different structures that can be used as the previously disclosed attachment members. One non-limiting example is a hook 1302 shown in FIG. 13. Other forms of hooks are also contemplated by the present invention. A first section 1304 of hook 1302 would be attached to the frame as previously discussed and a second section 1306 attaches to the sling, harness, or hammock. In this regard, second section 1306 could attach via pre-existing or added structures on the sling, harness, or hammock (e.g. straps, handles, D rings, V rings, etc.).

Figures 13, 14, 15:
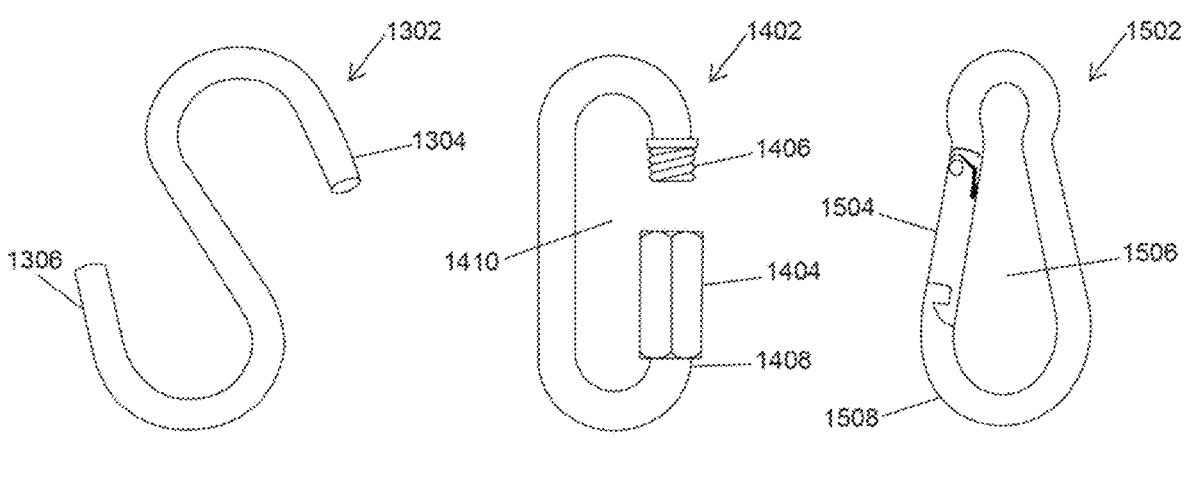
FIG. 13 shows a hook usable as an attachment member.
FIG. 14 shows a quick link chain connector usable as an attachment member.
FIG. 15 shows a carabiner usable as an attachment member.

FIG. 14 shows a quick link chain connector 1402 that can also be used as an attachment member. Other forms of quick link chain connectors are also contemplated by the present invention. Connector 1402 has a locking nut 1404 that is threadably engageable with threaded end 1406. When not engaged, locking nut 1404 slides along arm 1408 to provide access to space 1410. When locking nut 1404 is threadably engaged with threads 1406, access to space 1410 is closed. Connector 1402 would be attached to the frame as previously discussed. At the appropriate time, locking nut 1404 would not be engaged with threads 1406 to attach the sling, harness, or hammock and then engaged with threads 1406 to secure the sling, harness, or hammock. In this regard, the attachment could be via pre-existing or added structures on the sling, harness, or hammock (e.g. straps, handles, D rings, V rings, etc.).

FIG. 15 shows a carabiner 1502 as another non-limiting example. Other forms of carabiners are also contemplated by the present invention. Carabiner 1502 has a movable portion 1504 that pivots inward to provide access to a space 1506 and then pivots back outward to close access to space 1506. With movable portion 1504 pivoted inward, carabiner 1502 would be attached to the frame as previously discussed and then pivoted back outward. At the appropriate time, movable portion 1504 would be pivoted inward to attach the sling, harness, or hammock and then pivoted back outward to secure the sling, harness, or hammock. In this regard, the attachment could be via pre-existing structures on the sling, harness, or hammock (e.g. straps, handles, D rings, V rings, etc.).

In exemplary embodiments, movable portion 1504 comprises at least half of side 1508 to facilitate placement of straps, handles, D rings, V rings, etc. into space 1506. Typically, carabiners are designed to stay closed by default and may have optional locking mechanisms of various types. But when unloading the sling, harness, or hammock into the carabiners (or other attachment member), it is often preferable to have the carabiners or other attachment member in the open position to allow for easy unloading of the sling, harness, or hammock onto the carabiners or other attachment member to unload the weight without requiring tedious opening of the carabiners or other attachment member while simultaneously also unloading weight. This is much easier than having to open the carabiners or other attachment member one at a time to unload the sling, harness, or hammock while supporting the dog's weight using the walking in/docking method.

Figures 16, 17:
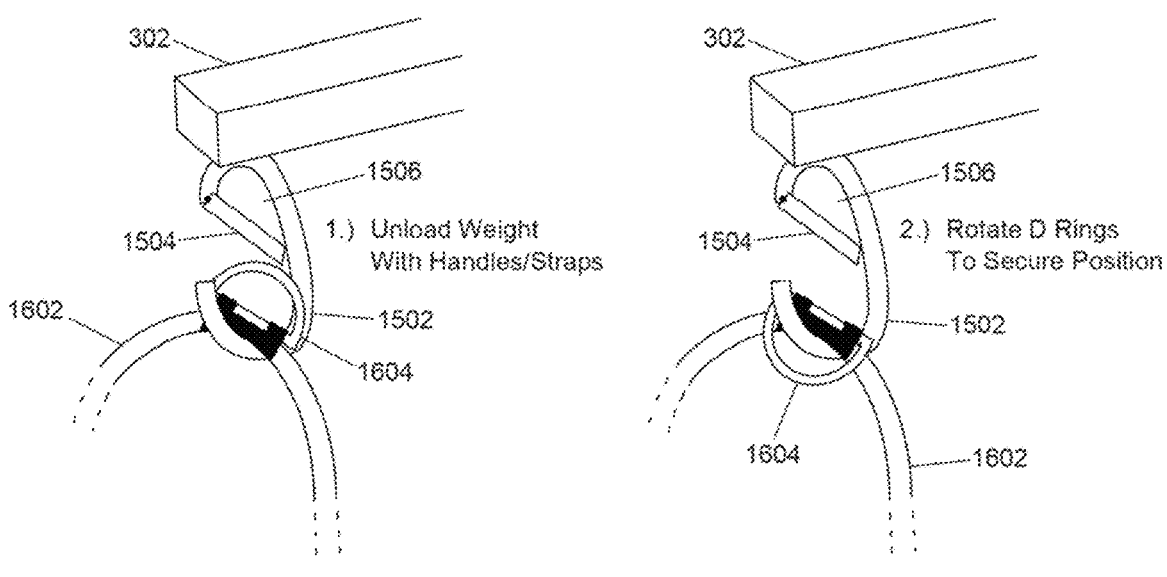
FIG. 16 shows a first step in unloading of weight using the handles/straps of a sling, harness, or hammock.
FIG. 17 shows a second step in unloading of weight using the handles/straps of a sling, harness, or hammock.

FIGS. 16 and 17 illustrate these concepts using frame 302 as a non-limiting example. When walking the dog into frame 302 (i.e. the docking method), straps/handles 1602 of harness 304 (could also be a sling or hammock) are inserted in space 1506 of carabiner 1502 to unload weight. D ring 1604 can be positioned to keep arm 1504 in an open position. If desired, straps/handles 1602 can be removed from space 1506 so that only D ring 1604 is held within space 1506.

Figure 18:
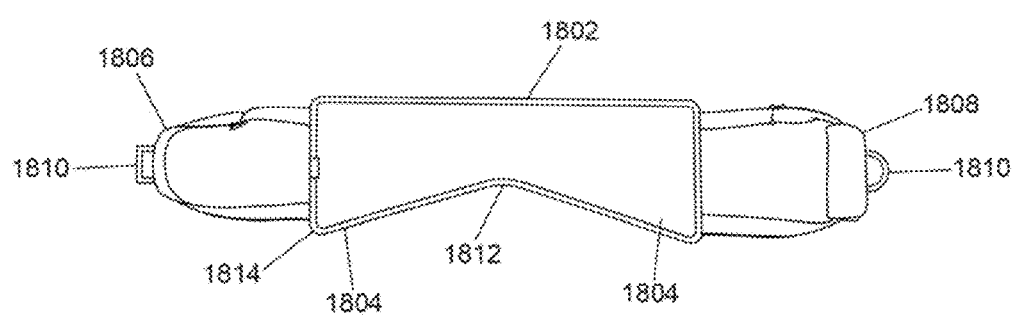
FIG. 18 shows an embodiment of a sling.

The devices according to the present invention can be used with commercially available slings, harnesses, and hammocks. However, these commercially available slings, harnesses, and hammocks can be modified. FIG. 18 shows a modified sling 1802, which like most slings has a body 1804 with handles 1806, 1808. The modifications include the addition of D rings 1810 (or similar devices) on handles 1806, 1808. Although one D ring 1810 is shown on each of handles 1806, 1808, more than one D ring can be used. The inclusion of D rings 1810 provides a secure coupling to the attachment members without "bunching up" of sling 1802. When D rings are added to a sling, harness, or hammock, they may be done in a fixed position or with an adjustable position. Further, the D rings may be permanently attached or removably attached.

Another modification is a cutout 1812 on a rear side 1814 of sling 1802. As rear side 1814 is adjacent the areas of the animal through which urine and feces pass, the cutout 1812 should lessen the occurrence of soiling sling 1802, particularly for male animals.

Figures 23, 24:
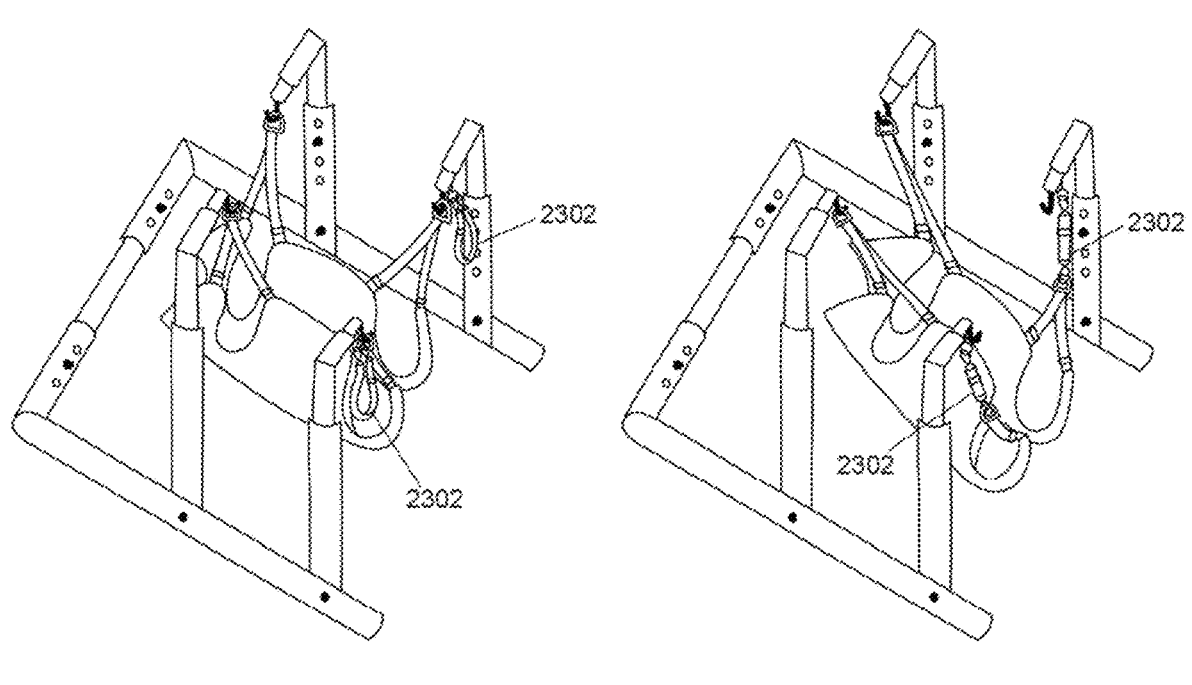
FIG. 23 shows strap extensions in a position for a standing posture.
FIG. 24 shows strap extensions in a position for a squatting posture.

In exemplary embodiments particularly useful with the squatting posture, frames 302, 1002 (i.e. frames with two or more support posts per side) can include squat extension straps. As best seen in FIGS. 23 and 24, squat extension straps 2302 are additional length of strap that can be connected to handles/straps of the hammock or harness (or potentially to another set of D rings on the harness or hammock which can serve as an attachment point near the upper rear of the dog) via its D rings for docking the rear end of the dog and the additional lengths of strap can also be connected to the attachment members in the rear (or attached to the frame in that area). Then the dog can be lowered into the squat position safely and easily. FIG. 23 shows the hammock with the dog in the standing position and the squat extension straps 2302 are independently connected to the frame waiting to be used.

FIG. 24 shows the configuration after the squat extension straps 2302 were unhooked at one end and instead hooked into the rear D rings on the hammock. The user would have lifted the dog out of the hooks as shown in FIG. 23 and slowly lowered the dog into the squat until the squat extension straps 2302 became pulled with tension as shown in FIG. 24. To bring the dog back into the standing position, do the steps in reverse. This method allows the user to first easily clip the dog into the device in the standing position. Then carefully connect the squat extension straps 2302 without holding the weight load of the dog. Then confidently lower the dog into the squat.

Note this method is especially useful for docking the dog into the device. If a user was alternatively picking their dog up and placing them in the device, they could just leave the hammock in the squatting configuration, if desired. For users using the devices according to the invention for other purposes beyond potty or bladder expression, such as mobility or rehabilitation, the squat extension straps would be especially useful for both the place in and dock in methods. For another alterative squatting method, additional hooks/carabiners may be located lower on the rear end vertical supports for accepting the rear attachment D rings. The human user can lift the D rings out of the back-end hooks/carabiners used for standing and then lower the dog into the squat and attach these D rings to the additional lower hooks/carabiners for squatting.

Figure 25:
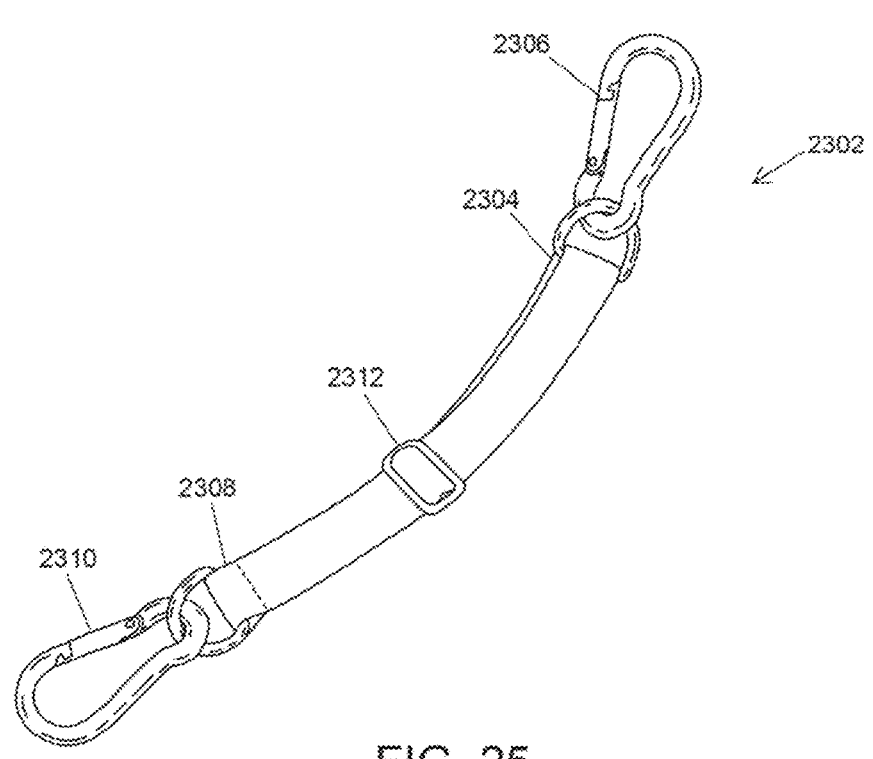
FIG. 25 shows a squat strap extension.

FIG. 25 shows an exemplary embodiment of squat extension strap 2302. A first end 2304 of strap 2302 includes a first clip 2306 and a second end 2308 of strap 2302 includes a second clip 2310. Initially both first and second clips 2306, 2310 are coupled to the attachment member on the frame. One of clips 2306, 2310 would be uncoupled from the frame attachment member and then coupled to the strap/handle or D ring on a harness or hammock for the squatting posture. Although first and second clips 2306, 2310 are shown as carabiners, any suitable mechanism can be used. Optionally, strap 2302 is extendable in length using buckle 2312 or other similar means.

Methods of Use

Figure 19:
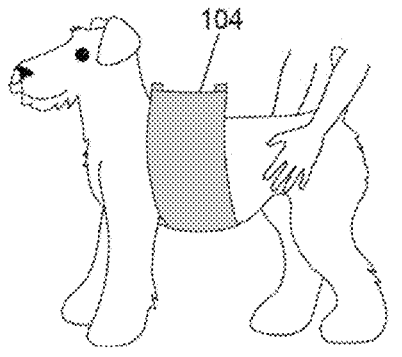
FIG. 19 shows a dog in a standing posture having its bladder expressed.
Figure 20:
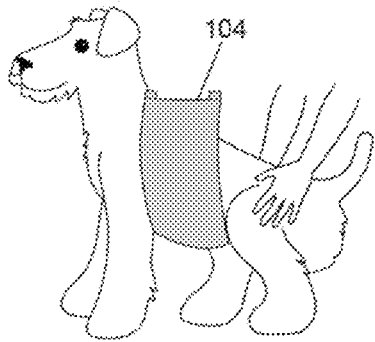
FIG. 20 shows a dog in a squatting posture having its bladder expressed.

Although methods of use have been included in the previous description of the various structures, an overview of methods of use is presented herein with reference in particular to FIGS. 19-22 in which the frame is not shown to add in visualization. FIG. 19 shows a dog in sling 104 in a standing posture after the dog is placed on sling 104 or walked into the frame, possibly with the assistance of sling 104. In this standing posture the dog can urinate, defecate, or have its bladder expressed (particular if the dog is a male) as shown in FIG. 19. If sling 104 is rotated towards the head of the dog while the dog is supported by sling 104 as shown in FIG. 20, the dog will be moved into a squatting posture, from which the dog can urinate, defecate, or have its bladder expressed (particularly if the dog is a female) as shown in FIG. 20.

Figure 21:
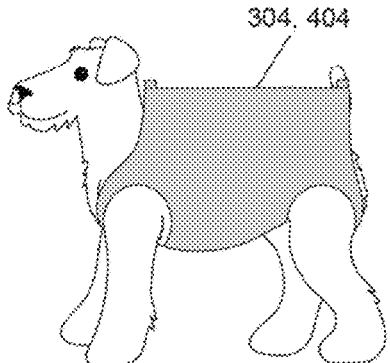
FIG. 21 shows a dog in a standing posture.
Figure 22:
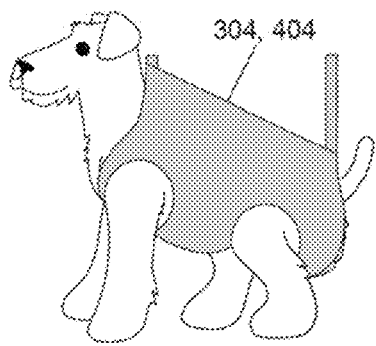
FIG. 22 shows a dog in a squatting posture.

FIG. 21 shows a dog in a harness 304 or hammock 404 in a standing posture after the dog is placed on harness 304 or hammock 404 or walked into the frame, possibly with the assistance of harness 304 or hammock 404. In this standing posture the dog can urinate, defecate, or have its bladder expressed (particular if the dog is a male). If the front end of harness 304 or hammock 404 is raised and/or the back end of harness 304 or hammock 404 is lowered while the dog is supported by harness 304 or hammock 404 as shown in FIG. 22, the dog will be moved into a squatting posture, from which the dog can urinate, defecate, or have its bladder expressed (particularly if the dog is a female).

Human users can either place a dog in the device or walk them into the device with the sling, harness, or hammock. The device supports the dog's weight in a natural position, so the human user doesn't have to bear the weight of the dog. The dog can then urinate, defecate, have its bladder expressed by a human user, be moved like a carriage, or engage in assisted walking like a wheelchair, while being supported and assisted by the device. When done using the device, the human user will pick the dog up and lift them out of the device or walk them out by using the sling, harness, or hammock.

The stationary and mobile versions and their docking station variations provide structural support for an animal's weight especially for the animal to engage in urination, defecation, and or have bladder expression performed upon it by a human user. Functional usage of each version includes supporting or assisting an animal during the acts of urination, defecation, bladder expression, mobility, bathing, trimming nails, treating, breeding, transporting, surgical procedures, and other uses. As previously noted, the animal may be a dog, cat, or any other suitable animal.

All references cited herein are expressly incorporated by reference in their entirety. It will be appreciated by persons skilled in the art that the invention is not limited to what has been particularly shown and described herein above. In addition, unless mention was made above to the contrary, it should be noted that all of the accompanying drawings are not to scale. There are many different features to the invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the invention set forth herein that are within the scope and spirit of the present invention are to be included as further embodiments of the invention.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device for assisting animal waste evacuation or bladder expression, the device comprising:

a frame configured and dimensioned so that at least a portion of the animal is positionable in the frame; and a support device operatively associated with the frame for supporting at least part of the animal's weight during waste evacuation or bladder expression, wherein the support device is a sling, harness, or hammock; and wherein the frame has a length, width, and height, and each of the length, the width, and the height is adjustable to accommodate animals of different size and to adjust support of the animal provided by the support device;

wherein the frame comprises a base with first and second legs connected to each other at one end by a crossbar such that an open area at the end of the base opposite the crossbar is configured and dimensioned so that at least a portion of the animal is positionable in the open area;

wherein the first and second legs are adjustable in length to provide the frame length adjustability and wherein at least one of the first and second legs is movable laterally relative to the crossbar to provide the frame width adjustability;

wherein the base further comprises at least one support post extending from the first leg and at least one support post extending from the second leg for coupling the support device to the frame, wherein the at least one support post extending from the first leg and the at least one support post extending from the second leg each is adjustable in length to provide the frame height adjustability;

wherein the at least one support post extending from the first leg comprises a first front support post and a first rear support post, and the at least one support post extending from the second leg comprises a second front support post and a second rear support post;

wherein a first front lateral extension extends from the first front support post, a first rear lateral extension extends from the first rear support post, a second front lateral extension extends from the second front support post, and a second rear lateral extension extends from the second rear support post;

wherein an end of each of the first front lateral extension, first rear lateral extension, second front lateral extension, and second rear lateral extension includes an attachment member for removably coupling the support device to the frame; and further comprising a first squat extension strap with first and second ends removably attachable to the frame in a rear area of the frame and a second squat extension strap with first and second ends removably attachable to the frame in the rear area of the frame.

2. The device of claim 1, wherein at least one of the attachment members is a carabiner.

3. The device of claim 1, wherein each attachment member is a carabiner.

4. The device of claim 1, wherein the first front support post and the second front support post are located at approximately the same distance from the crossbar and the first rear support post and the second rear support post are located at approximately the same distance from the crossbar.

5. The device of claim 4, wherein the support device is a harness or hammock; and wherein the attachment members removably couple the harness or hammock to the frame.

6. The device of claim 5, wherein each attachment member is a carabiner.

7. The device of claim 1, wherein each of the first front and second front lateral extensions is adjustable in length so that a distance between the first front and second front lateral extensions is adjustable; and wherein each of the first rear and second rear lateral extensions is adjustable in length so that a distance between the first rear and second rear lateral extensions is adjustable to alter support of the support device.

8. The device of claim 7, wherein the support device is a harness or hammock; and wherein the attachment members removably couple the harness or hammock to the frame.

9. The device of claim 8, wherein each attachment member is a carabiner.

10. The device of claim 9, wherein height of the first front support post and the second front support post is adjusted to be greater than height of the first rear support post and the second rear support post to position an animal in the frame in a squatting posture.

11. The device of claim 1, wherein each of the first front support post, first rear support post, second front support post, and second rear support post is adjustable in length to provide the frame height adjustability.

12. The device of claim 11, further comprising a plurality of wheels to provide mobility of the device.

13. The device of claim 1, wherein each squat extension strap includes a first clip at a first end and a second clip at a second end, wherein the first and second clips are configured to be coupled to the frame, and wherein one of the first and second clips is configured to be uncoupled from the frame and coupled to a strap, handle, or D ring on the harness or hammock for positioning the animal in a squatting posture.

14. The device of claim 13, wherein each squat extension strap is extendable in length.

15. The device of claim 12, wherein at least one of the plurality of wheels has a locking mechanism to prevent or hinder rotation.

16. The device of claim 1, further comprising a handle integral to, permanently attached to, or removably attached to the crossbar.

17. The device of claim 1, wherein at least one of the first front support post, first rear support post, second front support post, and second rear support post is removably attached to the first leg or the second leg to facilitate transport by making the frame collapsible.

18. The device of claim 1, further comprising a first motorized lift for changing height of the first front support post and the second front support post and a second motorized lift for changing height of the first rear support post and the second rear support post, wherein the first and second motorized lifts operate independently of one another.

19. The device of claim 1, wherein the harness or hammock includes at least one D ring on a handle or strap of the harness or hammock for coupling to the attachment member.

20. A device for assisting animal waste evacuation or bladder expression, the device comprising:

a frame configured and dimensioned so that at least a portion of the animal is positionable in the frame; and a support device operatively associated with the frame for supporting at least part of the animal's weight during waste evacuation or bladder expression, wherein the support device is a harness or hammock; and wherein the frame has a length, width, and height, and each of the length, the width, and the height is adjustable to accommodate animals of different size and to adjust support of the animal provided by the support device;

wherein the frame comprises a base with first and second legs connected to each other at one end by a crossbar such that an open area at the end of the base opposite the crossbar is configured and dimensioned so that at least a portion of the animal is positionable in the open area;

wherein the first and second legs are adjustable in length to provide the frame length adjustability and wherein at least one of the first and second legs is movable laterally relative to the crossbar to provide the frame width adjustability;

wherein the base further comprises at least one support post extending from the first leg and at least one support post extending from the second leg for coupling the support device to the frame;

wherein the at least one support post extending from the first leg and the at least one support post extending from the second leg each is adjustable in length to provide the frame height adjustability;

wherein the at least one support post extending from the first leg comprises a first front support post and a first rear support post; wherein the at least one support post extending from the second leg comprises a second front support post and a second rear support post; and wherein the first front support post and the second front support post are located at approximately the same distance from the crossbar and the first rear support post and the second rear support post are located at approximately the same distance from the crossbar;

wherein a first front lateral extension extends from the first front support post, a first rear lateral extension extends from the first rear support post, a second front lateral extension extends from the second front support post, and a second rear lateral extension extends from the second rear support post; wherein each of the first front and second front lateral extensions is adjustable in length so that a distance between the first front and second front lateral extensions is adjustable; and wherein each of the first rear and second rear lateral extensions is adjustable in length so that a distance between the first rear and second rear lateral extensions is adjustable to alter support of the support device;

and wherein an end of each of the first front lateral extension, first rear lateral extension, second front lateral extension, and second rear lateral extension includes an attachment member for removably coupling the harness or hammock to the frame; and a first squat extension strap with first and second ends removably attachable to the frame in a rear area of the frame and a second squat extension strap with first and second ends removably attachable to the frame in the rear area of the frame.

\* \* \* \* \*